US006268679B1

(12) United States Patent
Reynvaan et al.

(10) Patent No.: US 6,268,679 B1
(45) Date of Patent: Jul. 31, 2001

(54) CARBON BRUSH FOR AN ELECTRICAL MACHINE IN A VEHICLE

(75) Inventors: Conrad Reynvaan, Bad Homburg (DE); Emmanuel Joly, Asnieres (FR)

(73) Assignee: Deutsche Carbone AG, Frankfurt (DE)

( * ) Notice: Subject to any disclaimer, the term of this patent is extended or adjusted under 35 U.S.C. 154(b) by 0 days.

(21) Appl. No.: 09/514,373

(22) Filed: Feb. 28, 2000

(30) Foreign Application Priority Data

Mar. 24, 1999 (DE) .......................................... 299 05 433 U

(51) Int. Cl.$^{7}$ .......................... H02K 13/00; H01R 39/18; H01R 39/26

(52) U.S. Cl. ............................................ 310/248; 310/253

(58) Field of Search .................................... 310/248, 251, 310/252, 253, 233; 29/596–598; 252/503, 510, 511; 264/104–105

(56) References Cited

U.S. PATENT DOCUMENTS

| | | | | |
|---|---|---|---|---|
| 3,714,482 | * | 1/1973 | Lace | 310/228 |
| 4,220,884 | * | 9/1980 | Sternbergh | 310/251 |
| 5,266,860 | * | 11/1993 | Chiba et al. | 310/233 |

* cited by examiner

*Primary Examiner*—Tran Nguyen
(74) *Attorney, Agent, or Firm*—Dennison, Scheiner, Schultz & Wakeman

(57) ABSTRACT

The invention relates to carbon brushes for electrical machines with commutator in a vehicle with a 36 volt electrical system. According to the invention, the specific electrical resistance of a carbon brush that can be used in a starter motor is greater than 1,000 μΩcm, the specific electrical resistance of a carbon brush that can be used in an auxiliary electric motor or an alternator is greater than 10,000 μΩcm, and the specific electrical resistance of a carbon brush that can be used in a fuel pump motor is greater than 20,000 μΩcm.

6 Claims, No Drawings

CARBON BRUSH FOR AN ELECTRICAL MACHINE IN A VEHICLE

BACKGROUND OF THE INVENTION

1. Field of the Invention

The invention is concerned with a carbon brush used in an electrical machine with commutator for use in a vehicle.

2. Description of Related Art

In accordance with current technology, carbon brushes of this type are constructed to have a specific electrical resistance by suitable selection and dimensioning of the brush material, particularly of the copper component, which takes into account specific requirements depending on the vehicle voltage. During operation of an electrical machine of this kind with commutator, a brush will short circuit two neighbouring commutator segments when passing from one segment to the next neighbouring segment. The short circuit current which results from this, the magnitude of which depends on the overall resistance formed by the resistance of the carbon brush plus the contact resistance between the carbon brush and the collector segment, should be kept to a minimum for good commutation. This requirement would indicate the need for a relatively high specific resistance of the carbon brush material, which, however, is in contradiction to another requirement: for on the other hand, the wiring loss in the electrical machine of electrical power that is transmitted through the carbon brushes should be as small as possible. This problem becomes considerably more acute if an attempt is made to adapt an electrical machine which has been designed for a certain operating voltage to work at a higher operating voltage, but making as few drastic design changes as possible. If a motor is to be dimensioned to operate at a higher voltage while retaining as far as possible the existing collector, an increase is needed in the number of windings, whose inductance then increases in accordance with the square law. There is an additional load placed on the sliding contacts of the commutator owing to the increased voltage.

For this reason, it is usual to increase the number of commutator segments or collector segments when the electrical machine is adapted to operate at a higher voltage. However, this involves a considerably greater amount of work. Motors normally found in vehicle applications have between three and 24 segments.

Carbon brush materials used in practice have the following specific resistance values for the relevant operating voltage of a vehicle electrical system: carbon brushes intended to be used in vehicles with a 12 volt electrical system have a specific resistance of less than 100 μΩcm if the carbon brush is to be used in a starter motor, in the range 50–1000 μΩcm for auxiliary motors and alternators, and up to several thousand μΩcm in the special case of motors used for fuel pumps. For vehicles with a 24 volt electrical system, the specific resistance of the carbon brushes is between 20 and 100 μΩcm for starter motors, in the range 250–4000 μΩcm for auxiliary motors, and up to 7000 μΩcm for the carbon brushes of motors used for fuel pumps. For forklift trucks using a 48 volt electrical system, carbon brush materials with a specific resistance between 500 and 2500 μΩcm have been successfully used; carbon brush materials with a specific resistance of approximately 10,000 μΩcm have also been used, but only in individual cases, namely in reversible motors where particularly high demands are placed on the commutators. In completely different areas of application for household equipment and portable power tools which operate at 110 or 230 volts, carbon brushes can be found with a specific resistance between 25,000 and 200,000 μΩcm.

SUMMARY OF THE INVENTION

The invention described here is aimed at creating suitable carbon brushes for vehicle electrical systems which in the course of further development will exhibit a charging voltage of 42 V for the vehicle battery and an operating voltage of approximately 36 V for the alternator of such vehicle electrical systems. A voltage as high as this is desirable on account of the higher energy demands of the electric consumers in such vehicle electrical systems; they also have the advantage, among other things, of a relatively smaller wiring loss (see Focus magazine, issue 6, 1999, page 176 ff).

This results in the task upon which the present invention is based; to create a carbon brush which makes it possible to minimise the number of commutator or collector segments of electrical machines in vehicles in spite of good commutation, without the carbon brush causing high losses of electrical energy transmitted to or from the armature of the electrical machine.

DETAILED DESCRIPTION OF THE INVENTION

The objects of the invention are accomplished for the various applications for carbon brushes in vehicles by using brush materials which have a specific electrical resistance in accordance with the invention. Thus, for a vehicle having a 36 volt electrical system, the starter motor includes a carbon brush having a specific electrical resistance greater than 1,000 μΩcm, an auxiliary electrical motor or alternator includes a carbon brush having specific electrical resistance greater than 10,000 μΩcm, and a fuel pump motor includes a carbon brush having a specific electrical resistance greater than 20,000 μΩcm.

Common to the various dimensionings of the specific electrical resistance adapted to these applications is the fact that the specific resistance is greater than that of a carbon brush for the corresponding application in a 12 volt vehicle electrical system by a factor of 10, or preferably 30 to 60, whereby the specific resistance can even be greater than that for common applications in forklift trucks with a 48 volt electrical system.

It has emerged that by dimensioning the carbon brush materials in accordance with the invention, these can be used in connection with commutators with a small number of commutator segments or collector segments, in fact, in a number no larger than is needed for applications in 12 volt vehicle electrical systems. In spite of this, good commutation of the carbon brush is achieved together with a long service life. For this reason, it is possible to use significant components, including collector and brush holders, of electrical machines which are designed for 12 volt operation. These are then practically limited to the cross-section of the wire in the armature windings, which must be reduced by a factor of 3, and a trebling of the number of windings when carbon brushes with a relatively high resistance in accordance with the invention are used.

Although the value range for dimensioning the specific electrical resistance for 36volt systems that would seem appropriate from experience of dimensioning for other vehicle system voltages is exceeded, brushes dimensioned in accordance with the invention cause surprisingly low losses of electrical power in the electrical machine, which may be due to the fact that the commutation compared with that of carbon brushes with a lower specific electrical resistance is improved to an extent that is greater than the increased loss of power that occurs in the carbon brush.

One further important advantage is the reduced emission of electromagnetic interference from carbon brushes dimensioned in accordance with the invention.

It is further advantageous to use such high resistance materials with at least 15% impregnated copper to reduce the voltage drop at the brush/commutator interface.

What is claimed is:

1. A carbon brush for an electrical machine with a commutator in a vehicle having a 36 volt electrical system, wherein the electrical machine is a starter motor, and the carbon brush has a specific electrical resistance greater than 1,000 μΩcm.

2. A carbon brush for an electrical machine with a commutator in a vehicle having a 36 volt electrical system, wherein the electrical machine is one of an auxiliary electrical motor and an alternator, and the carbon brush has a specific electrical resistance greater than 10,000 μΩcm.

3. A carbon brush for an electrical machine with a commutator in a vehicle having a 36 volt electrical system, wherein the electrical machine is a fuel pump motor, and the carbon brush has a specific electrical resistance greater than 20,000 μΩcm.

4. In a vehicle including a 36 volt electrical system, the improvement comprising an electrical machine with a commutator, the electrical machine being a starter motor comprising a carbon brush of specific electrical resistance greater than 1,000 μΩcm.

5. In a vehicle including a 36 volt electrical system, the improvement comprising an electrical machine with a commutator, the electrical machine being one of an auxiliary electric motor and an alternator comprising a carbon brush of specific electrical resistance greater than 10,000 μΩcm.

6. In a vehicle including a 36 volt electrical system, the improvement comprising an electrical machine with a commutator, the electrical machine being a fuel pump motor comprising a carbon brush of specific electrical resistance greater than 20,000 μΩcm.

* * * * *